July 16, 1957   G. H. SPECKMAN   2,799,181
AUTOMOTIVE VEHICLE DUAL CONTROL UNIT
Filed Feb. 24, 1954   2 Sheets-Sheet 1

Gilbert H. Speckman
INVENTOR.

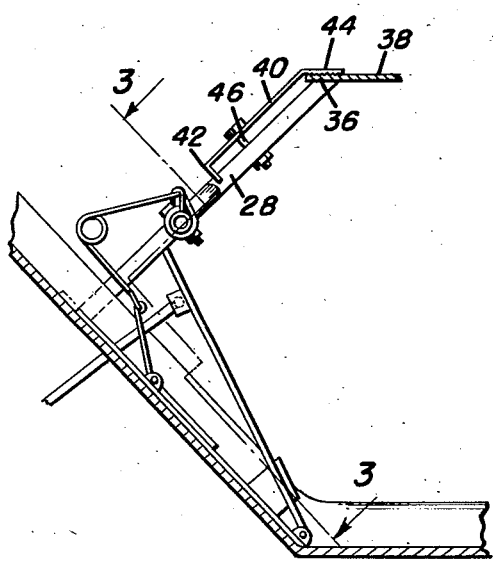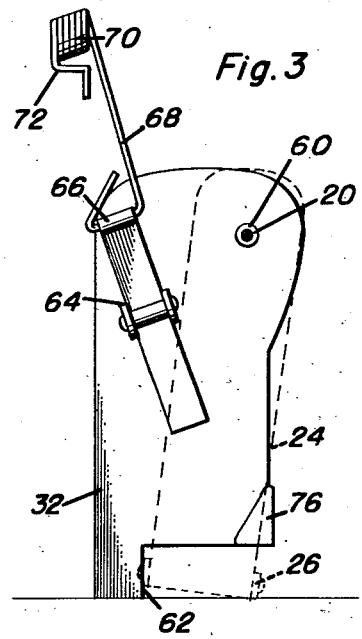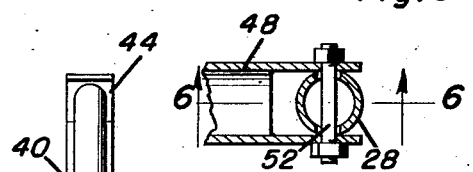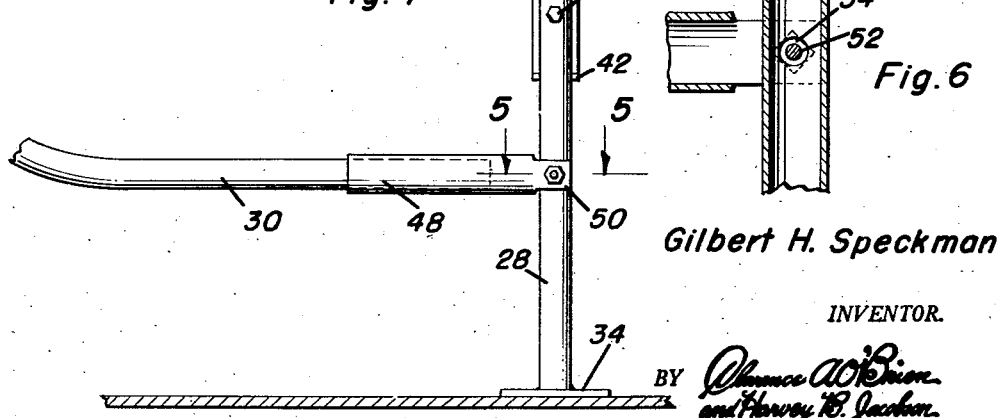
Gilbert H. Speckman
INVENTOR.

United States Patent Office 2,799,181
Patented July 16, 1957

2,799,181

AUTOMOTIVE VEHICLE DUAL CONTROL UNIT

Gilbert H. Speckman, Aurora, Ind.

Application February 24, 1954, Serial No. 412,150

10 Claims. (Cl. 74—562.5)

The present invention relates to a dual control unit for automotive vehicles and more particularly relates to a removable dual control attachment for vehicles.

The primary object of the invention is to provide a dual control attachment for automotive vehicles for simultaneously operating the vehicle brake and acelerator pedals which attachment may be mounted and removed quickly and simply without the necessity for skilled labor and which requires no modification of the vehicle in either its attachment or removal.

An extremely important object of this invention is to provide an exceedingly simple, cheap and easily mounted dual control attachment for vehicles by means of which the brake pedal in the vehicle may be actuated from a position remote from the driver of the vehicle and whereby the accelerator pedal will be raised simultaneously and in response to the pedression of the brake pedal from such remote position.

In recent years, automobiles with automatic transmissions have been produced in larger and larger quantities. Many individuals refrain from buying vehicles having such automatic transmissions due to fear of their inability to drive vehicles so equipped; also, when such individuals are induced to drive vehicles equipped with these transmissions, due to their unfamiliarity with the operation of the automatic transmissions they frequently become involved in minor accidents and the like. Consequently, it is an exceedingly important purpose in this invention to provide a dual control attachment for such vehicles which may be applied quickly and simply without damage to the vehicle which will permit a person other than the driver on the front seat of the vehicle to control the actuation of the brake and accelerator pedals in order to give timid drivers increased confidence in their initial operation of vehicles having these automatic transmissions and to prevent minor accidents and the like which may occur due to the unfamiliarity of the driver with the operation of such transmissions.

Likewise, it is an object of this invention to provide a dual control unit for automotive vehicles which may serve as an inexpensive attachment for driving instruction to beginning drivers of any automotive vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a side elevational view of a portion of the attachment disclosing the relation to the vehicle accelerator pedal;

Figure 3 is a top view of a plate underlying the vehicle accelerator per se disclosing the means whereby the accelerator may be raised;

Figure 4 is a front elevational view of a portion of the attachment disclosing how the same is mounted within the vehicle and the operation thereof;

Figure 5 is a cross sectional view taken substantially along the plane of section line 5—5 of Figure 4;

Figure 6 is a cross sectional view taken substantially along section line 6—6 of Figure 5.

Figure 1:
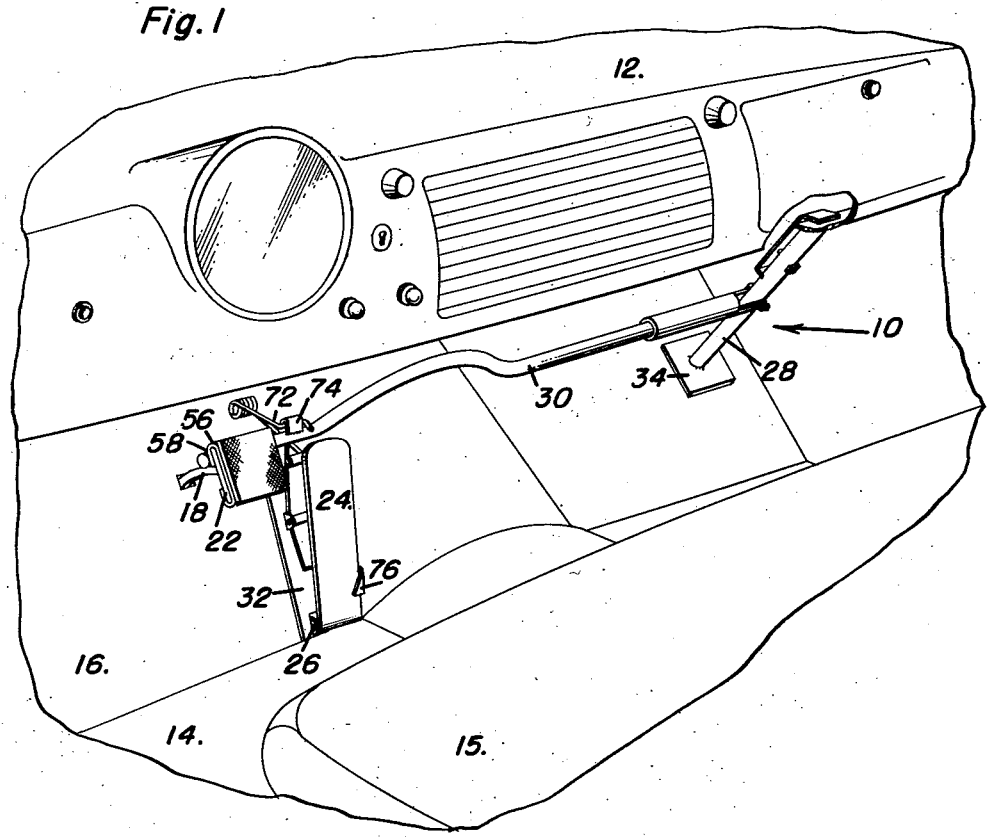
Figure 1 is a view of a portion of the interior of an automotive vehicle disclosing the front floor board and dash panel arrangement with the dual control unit of the present invention attached thereto.
Figure 7:
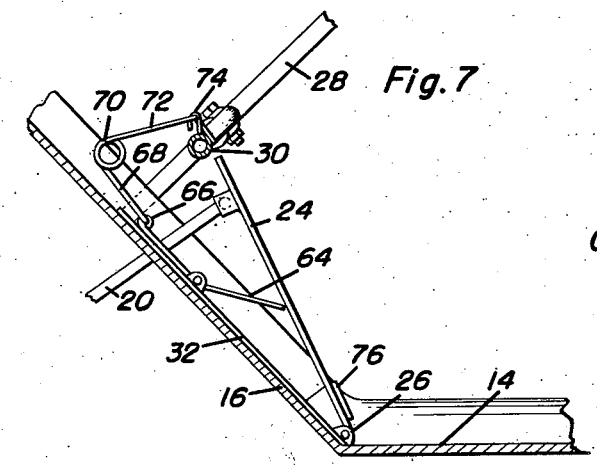
Figure 7 is a cross sectional view substantially similar to Figure 2 disclosing the accelerator pedal means in action and raising the accelerator pedal.

In the drawings, and more notably in Figure 1 of the drawings, the dual control unit or attachment constituting the present invention is designated in its entirety by the numeral 10. As shown in this figure, a portion of the interior of the vehicle is shown including a dash or instrument panel 12, front floor board 14 and front seat 15. These elements are, of course, conventional in vehicles. On the upwardly angled portion of the floor board 16 which may in many instances constitute the fire wall of the vehicle, are provided suitable apertures, unnumbered, through which the brake lever pedal 18 and the accelerator pedal rod 20 project. For purposes of illustration, no clutch pedal is shown, since with most automatic transmissions none is necessary. However, as the description proceeds, it will be apparent that the dual control attachment is equally adaptable to vehicles in which the clutch pedal is retained.

As is customary, a brake pedal 22 is disposed above the floor board section 16 on the upper end of the brake lever 18 and an accelerator pedal 24 is pivoted at its lower end as at 26 to the floor board and attached at its upper end portion to the upper end of the accelerator rod 20.

The dual control attachment 10 constituting the present invention comprises essentially three basic parts, a post 28, an elongated bar or tubular member 30 adapted to extend transversely across the floor board parallel to the instrument panel 12 of the vehicle and a plate 32 adapted to underlie the accelerator pedal 24 of the vehicle.

To mount the attachment 10, the post 28 is provided with a flat base 34 at its lower end adapted to rest against the angle portion 16 of the floor board on the side of the vehicle opposite the driver's side. The upper end of the post 28 is cut-off at an angle to the base of the post as shown at 36 to rest under the lip 38 of the instrument panel 12. Clamping means in the form of strap 40 firmly clamps the upper end of the post to the lip 38 of the dash panel 12.

The strap 40 simply consists of an elongated flat member having a lower end flange 42 partially embracing the post 28 the balance of the strap being spaced from the post and extending upwardly parallel to the post with the upper end portion of the strap 40 being inwardly bent as at 44 to overlie the lip 38 of the instrument panel. Fastener 46 projects through the plate and the post intermediate the ends of the plate or strap 40 and the clamping action of the clamping means on the lip 38 is controlled by the loosening or tightening of this fastening means.

Intermediate the ends of the post 28, a tubular sleeve 48 is pivotally secured. One end of the sleeve 48 is provided with a pair of longitudinally extending ears 50 which embrace the post at diametrically opposite sides thereof. A fastening member in the form of a pivot bolt 52 extends through the ears and the post 28 to pivotally mount the sleeve 48 on the post. In this connection, it is to be noted that the post is provided with enlarged apertures 54 (note Figure 6) on the diametrically opposite sides thereof through which the bolt 52 passes whereby some wobbling action as well as free pivoting action of the sleeve 48 is permitted. Obviously other means could be provided, the one illustrated having been chosen from a standpoint of simplicity and economy. The elongated tubular bar 30 telescopes at its one end portion into the sleeve 48 and, as noted previously, extends transversely across the floor board parallel to the instrument panel 12. At its free end, the bar 30 is provided with a brake attaching means in the form of a wedge-shaped sleeve member 56 adapted to slip over the brake pedal 22 of the vehicle. Essentially, this sleeve member consists of flat plate secured to the end of the bar 30 having underturned flanges 58 tapering outwardly from the undersurface of the plate from one end of the plate to the other to provide the wedge-shaped effect in attaching the sleeve over a brake pedal.

The plate 32 which underlies the accelerator pedal 24 has an aperture 60 therethrough adjacent the upper end thereof for the passage of the accelerator rod 20. At its lower end, the plate 32 is under-cut as at 62 so that the same will not interfere with the pivot mount 26 of the accelerator pedal 24.

Intermediate its ends and pivotally mounted at an angle to the longitudinal axis of the plate 32 is a bell crank 64 having one end thereof underlying the accelerator pedal 24 and the other end thereof being disposed outwardly away from this pedal. The outer end of the bell crank 64 is provided with an attaching eye 66 to which one end of a resilient compression rod 68 is attached. Intermediate its ends, the lever or rod 68 is provided with a series of resilient coils 70. The elongated tubular bar 30 is provided adjacent the brake attaching means 56 with a hook member 74 which swingably receives the upper end portion 72 of the resilient compression rod or lever 68.

Along its lower side edge portion, the plate 32 is provided with a lip 76 which overlies the accelerator pedal 24 to limit the upward movement of the accelerator pedal.

In assembling the attachment 10, the accelerator pedal 24 is first unseated from the ball at the upper end of the accelerator rod 20 and the plate 32 secured in place. Then, the brake attaching sleeve 56 is slipped over the brake pedal 22 and the post 28 secured to the dash panel lip 38 in its proper position. Then, the upper end portion 72 of the spring compression rod 68 is slipped under the eye member 74 on the elongated bar 30 and the attachment is ready for operation.

The operation of the device is comparatively simple; when the driver of the automobile has either lost control of the automobile or for some other reason is desired to be relieved of control of the movement of the automobile, the individual on the other side of the front seat needs merely to press down at any point along the elongated member 30 which will cause this member to swing downwardly as it depresses the brake pedal 22. Initially, as the depression of the brake pedal takes place, the bell crank 64 will be pivoted so that the end of this bell crank underlying the accelerator pedal 24 will press upwardly on the accelerator pedal to prevent further acceleration of the automobile and in fact to completely decelerate the same. The accelerator pedal is prevented from being raised too far and thus slipping off the ball on the top of the accelerator rod 20 by its engagement with the lip 76 overlying the pedal. Thus, as the bar 30 is pressed further, the actuation of the brake pedal will not cease but the pressure formerly applied to the bell crank 64 is now absorbed through the resilient spring lever or rod 68.

As is readily apparent, the attachment in no way requires any modification of the automobile and is formed in such a manner either through its application or its removal, no damage will result to the automobile whatsoever. Further, the application and removal of the attachment are obviously simple and may be carried out without the necessity of any particular mechanical skill.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A dual control attachment for automotive vehicles for the simultaneous actuation of the foot brake pedal and accelerator pedal of the vehicle from a position remote from these pedals, said attachment including brake pedal actuating means for attachment to the brake pedal of the vehicle for depression of the pedal from a position remote therefrom, and accelerator pedal actuating means operatively connected to said brake actuating means for raising the accelerator pedal in response to movement of said brake pedal actuating means.

2. A dual control attachment for automotive vehicles comprising an elongated member adapted to extend transversely across the vehicle, means for attaching one end of said member to a portion of a vehicle remote from the vehicle brake pedal, means on the other end of said member for attachment to the brake pedal of a vehicle, an element adapted to underlie the accelerator pedal of a vehicle, movable means on said element adapted to engage an accelerator pedal and raise the same, and means operatively connecting said movable means to said elongated member whereby the accelerator pedal will be raised by said movable means in response to downward movement of the elongated member.

3. The combination of claim 2 wherein said brake pedal attaching means comprises a sleeve for slidably embracing the brake pedal.

4. A dual control attachment for automotive vehicles comprising an elongated member, means for attaching one end of said member to a portion of a vehicle remote from the vehicle brake pedal, means on the other end of said member for attachment to the brake pedal of a vehicle, an element adapted to underlie the accelerator pedal of a vehicle, movable means on said element adapted to engage an accelerator pedal and raise the same, means operatively connecting said movable means to said elongated member to raise the accelerator pedal in response to downward movement of the elongated member, said means for attaching said elongated member to a portion of the vehicle remote from said brake pedal comprising a post adapted to rest at its lower end on the floor board of a vehicle, and clamping means at the upper end of said post for attachment to the dash panel of the vehicle, said elongated member being pivotally attached to said post.

5. A dual control attachment for automotive vehicles comprising an elongated member, means for attaching one end of said member to a portion of a vehicle remote from the vehicle brake pedal, means on the other end of said member for attachment to the brake pedal of a vehicle, an element adapted to underlie the accelerator pedal of a vehicle, movable means on said element adapted to engage an accelerator pedal and raise the same, means operatively connecting said movable means to said elongated member to raise the accelerator pedal in response to downward movement of the elongated member, said element comprising a flat plate, said movable means comprising a bell crank, one end of said crank engaging the accelerator pedal, said operatively connecting means comprising a resilient member connected at its ends to the other end of said bell crank and to said elongated member.

6. A dual control attachment for automotive vehicles comprising an elongated member adapted to extend transversely across the front floorboard of a vehicle, means for attaching one end of said member to a portion of a vehicle remote from the vehicle brake pedal, means on the other end of said member for attachment to the brake pedal of a vehicle, an element adapted to underlie the accelerator pedal of a vehicle, movable means on said element adapted to engage an accelerator pedal and raise the same, means operatively connecting said movable means to said elongated member to raise the accelerator pedal in response to downward movement of the elongated member, said means for attaching said elongated member to a portion of the vehicle remote from said brake pedal comprising a post adapted to rest at its lower end on the floor board of a vehicle, clamping means at the upper end of said post for attachment to the dash panel of the vehicle, said elongated member being pivotally attached to said post, said element comprising a flat plate, said movable means comprising a bell crank, one end of said crank engaging the accelerator pedal, said operatively connecting means comprising a resilient member connected at its ends to the other end of said bell crank and to said elongated member.

7. A dual control unit for automotive vehicles comprising a post adapted to extend between the floor board and the dash panel of the vehicle, an elongated rigid member, means pivotally attaching one end of said rigid member to said post intermediate the ends of said post, a brake attaching means on the other end of said rigid member for attachment to the brake pedal of a vehicle whereby downward pressure on the rigid member intermediate its ends will depress the brake pedal, a plate adapted to underlie the vehicle accelerator pedal, a bell crank on said plate having one end thereof adapted to engage the accelerator pedal and raise the same, and resilient means connecting said rigid member to the other end of said bell crank whereby the accelerator pedal will be raised as the brake pedal is depressed.

8. The combination of claim 7 wherein said plate has an aperture therein for the passage of an accelerator rod therethrough.

9. The combination of claim 8 wherein a stop element is provided on said plate adapted to overlie a portion of an accelerator pedal to limit the upward movement of the same.

10. A dual control unit for automotive vehicles comprising a post adapted to extend between the floor board and the dash panel of the vehicle, an elongated rigid member, means pivotally attaching one end of said rigid member to said post intermediate the ends of said post, a brake attaching means on the other end of said rigid member for attachment to the brake pedal of a vehicle whereby downward pressure on the rigid member intermediate its ends will depress the brake pedal, a plate adapted to underlie the vehicle accelerator pedal, a bell crank on said plate having one end thereof adapted to engage the accelerator pedal and raise the same, and resilient means connecting said rigid member to the other end of said bell crank whereby the accelerator pedal will be raised as the brake pedal is depressed, said means pivotally attaching one end of said rigid member to said post comprising a sleeve pivotal at one end to said post and slidably receiving said one end of said rigid member in the other end thereof.

References Cited in the file of this patent
UNITED STATES PATENTS

| | | |
|---|---|---|
| 1,992,644 | Watson | Feb. 26, 1935 |
| 2,065,354 | Streen | Dec. 22, 1936 |
| 2,113,974 | Arkley | Apr. 12, 1938 |
| 2,174,419 | Holtzclaw | Sept. 26, 1939 |
| 2,332,064 | Duffy | Oct. 19, 1943 |
| 2,349,742 | Macavoy | May 23, 1944 |
| 2,395,280 | Law | Feb. 19, 1946 |
| 2,465,183 | Allen | Mar. 22, 1949 |
| 2,498,246 | Buckel | Feb. 21, 1950 |
| 2,532,544 | Etnyre | Dec. 5, 1950 |
| 2,662,622 | Rodeback | Dec. 15, 1953 |
| 2,666,510 | Pokorny | Jan. 19, 1954 |
| 2,726,554 | McClellan | Dec. 13, 1955 |